United States Patent [19]

Hattori

[11] 4,142,676
[45] Mar. 6, 1979

[54] BIMETAL VALVE

[75] Inventor: Kyo Hattori, Toyota, Japan

[73] Assignee: Toyota Jidosha Kogyo Kabushiki Kaisha, Toyota, Japan

[21] Appl. No.: 812,681

[22] Filed: Jul. 5, 1977

[30] Foreign Application Priority Data

Sep. 18, 1976 [JP] Japan .................................. 51-111306

[51] Int. Cl.² ............................................. G05D 23/10
[52] U.S. Cl. .................................... 236/87; 236/101 R
[58] Field of Search ................... 236/39, 80 R, 81, 82, 236/83, 87, 48 R, 101 R, 101 A, 101 B, 101 E; 137/519; 251/75

[56] References Cited

U.S. PATENT DOCUMENTS

| | | | |
|---|---|---|---|
| 3,121,315 | 2/1964 | Matthies | 236/101 B |
| 3,930,613 | 1/1976 | Place | 236/87 X |
| 4,032,071 | 6/1977 | Imoto | 236/87 X |
| 4,068,800 | 1/1978 | Doherty | 236/87 X |
| 4,076,172 | 2/1978 | Inada et al. | 236/87 X |

Primary Examiner—Louis Rimrodt
Attorney, Agent, or Firm—Stevens, Davis, Miller & Mosher

[57] ABSTRACT

A bimetal valve is disclosed which is adapted to open and close a fluid flow conduit, or change flow paths from one to another due to the snapping action of bimetal discs in response to ambient temperature changes of the valve. In a first embodiment, there is used a combination of two bimetal discs and a valve seat cooperative therewith, thereby opening and closing flow of fluid between two ports. In a second embodiment, there is used a combination of two bimetal discs and a hold-down plate having a valve body thereon, thereby opening and closing flow of fluid between the two ports. In a third embodiment, there is used a combination of three bimetal discs, a hold-down portion, a stem portion and a valve body, thereby changing flow paths from one to another. In a fourth embodiment, there is used a combination of three bimetal discs, a partition plate, a stem portion secured to a valve body, thereby also changing fluid paths.

8 Claims, 15 Drawing Figures

BIMETAL VALVE

BACKGROUND OF THE INVENTION (a) Field of the Invention

This invention relates to a bimetal valve adapted to open or close a fluid flow conduit or to change the flow of a fluid from one path to another.

(b) Description of the Prior Art

When emission control devices are used in motor vehicles, the temperature conditions of the engines assume great importance to the efficient operation of the emission control devices. Accordingly, it becomes both desirable and necessary to provide signals associated with temperature changes in the internal combustion engines. These signals are transmitted in the form of a vacuum or atmospheric pressure through a bimetal valve.

However, prior art bimetal valves permit use of only one snapping or change-over temperature. As a result, where two or more change-over temperatures are required for three or more temperature ranges, such as a low temperature condition, a normal temperature condition after warm-up, and a super-heated condition of the internal combustion engine, two or more bimetal valves were required to be used in combination, to provide the desired pneumatic circuit. Representative prior art uses are disclosed in various publications.

SUMMARY OF THE PRESENT INVENTION

It is an object of the present invention to provide a bimetal valve which permits the opening and closing of a fluid flow conduit, or to change fluid paths from one to another in response to two or more change-over temperatures or temperature levels.

According to the first aspect of the present invention, there is provided a bimetal valve, comprising: a first housing member having first and second fluid passages therein; a second housing member fitted on the first housing member in a manner to define a chamber therebetween and first and second bimetal discs positioned in the chamber. In this embodiment, the first bimetal disc assumes an upwardly convex shape when the ambient temperature of the valve is above a first predetermined temperature level; the second bimetal disc assumes a downwardly convex shape, when the ambient temperature is below a second predetermined temperature level which is higher than the first predetermined temperature level; and assumes an upwardly convex shape when the ambient temperature is above the second predetermined level. A spring is provided in the chamber to urge the first bimetal disc against a bottom wall of the chamber. The first fluid passage has an opening into the chamber and is provided with a valve seat which cooperates with the first bimetal disc to close the opening. By means of the valve seat and first bimetal disc, the opening may be opened or closed in response to changes in the shape of the first and second bimetal discs at varying ambient temperatures.

According to the second aspect of the invention, there is provided a bimetal valve, as described in connection with first aspect, wherein a hold-down plate is positioned between the opening of the first fluid passage and the first bimetal disc, the hold-down plate having a valve body secured thereto on a side opposite the opening, whereby the opening may be opened or closed by the valve body in response to changes in shape of the first and second bimetal discs at varying ambient temperatures.

According to the third aspect of the invention, there is provided a bimetal valve, comprising: a first housing member having a main port, first, second and third sub-ports, a second housing member fitted on the first housing member in a manner to define a chamber therebetween, and a valve body fitted in the chamber in the first housing member. A guide member is fitted in the chamber in the second housing member, as well as a hold-down portion also fitted in the chamber in the second housing member. The hold-down portion has a stem portion which pierces the guide member to abut the valve body, whereby there are defined in the chamber a first sub-chamber formed between the bottom portion of the second housing member and the hold-down portion; a second sub-chamber formed between the hold-down portion and the guide member; a third sub-chamber formed between the hold-down portion and the valve body; and a fourth sub-chamber formed between the valve body and the main port. A spring or other suitable resilient means is confined between the valve body and the main port in the fourth sub-chamber. First, second and third bimetal discs are positioned in the first sub-chamber formed between the bottom portion of the second housing member and the hold-down portion, the first of these bimetal discs, positioned on the side of the bottom portion, assuming a rightwardly convex shape when the ambient temperature is below a first predetermined temperature level and assuming a leftwardly convex shape, when the ambient temperature is above the first predetermined level. The third bimetal disc, positioned on the side of the hold-down plate, assumes a rightwardly convex shape when the ambient temperature of the valve is below a second predetermined level higher than the first temperature level and assumes a leftwardly convex shape when the ambient temperature of the valve is above the second temperature level. The second bimetal disc, positioned between the first and third bimetal discs, assumes a leftwardly convex shape when the ambient temperature of the valve is below a third predetermined level higher than said second temperature level, and assumes a rightwardly convex shape when the ambient temperature of the valve is above the third predetermined level. The valve body is provided with an annular groove in its outer peripheral surface. The annular groove being located so as to be positioned in conformity with the first or third sub-ports, on one hand, and with the second sub-port, on the other. In this manner, fluid paths are established between the first sub-port and said second sub-port, between the main port and the second sub-port, between the main port and the third sub-port, and between the main port and the first sub-port, all depending on changes in shape, of the first, second and third bimetal discs at varying ambient temperatures. The valve body further includes a fluid passage which connects the annular groove with fourth sub-chamber which communicates with the main port.

According to the fourth aspect of the invention, there is provided a bimetal valve, comprising: a first housing member having a main port and first, second, and third sub-ports. A second housing member is fitted in the first housing member in a manner to form a hollow portion or chamber therebetween; a valve body having a stem portion is fitted in the chamber in the first housing member, and a guide member, having a central hole adapted to receive said stem portion therein is fitted in the chamber in the second housing member, whereby there is formed in the hollow portion a first sub-chamber formed between the bottom portion of the second housing member and the guide member; a second sub-chamber is formed between the valve body and the guide member; and a third sub-chamber is formed between the valve body and the main port. A spring is confined between the valve body and main port. First, second, and third bimetal discs are positioned in the first sub-chamber formed between the bottom portion of the second housing member and an end of the stem secured through the guide member, to the valve body. The first bimetal disc, positioned on the side of the bottom portion, assumes a rightwardly convex shape when the ambient temperature is below a first predetermined level, and a leftwardly convex shape when the ambient temperature is above first predetermined level. The third bimetal disc, positioned on the side of the end of the stem portion, assumes a rightwardly convex shape when the ambient temperature of the valve is below a second predetermined level which is higher than said first predetermined level, and assumes a leftwardly convex shape when the ambient temperature of the valve is above the second predetermined level. The second bimetal disc, positioned between the first and third bimetal discs, assumes a leftwardly convex shape when the ambient temperature of the valve is below a third predetermined level which is higher than the second temperature level and assumes a rightwardly convex shape when the ambient temperature of the valve is above the third predetermined level. The valve body is provided with an annular groove in its outer peripheral surface, the annular groove being located so as to be positioned in conformity with the first or third sub-ports on one hand, and with the second sub-port on the other. In this manner, fluid paths are established between the first sub-port and the second sub-port, between the main port and the second sub-port, between the main port and the third sub-port, and between the main port and the first sub-port, depending on changes in shape of the first, second, and third bimetal discs at varying ambient temperature of said valve. The valve body further includes a partition plate positioned between the second and third bimetal discs and a fluid passage connecting the annular groove with the fourth sub-chamber which is connected to the main port.

BRIEF DESCRIPTION OF THE DRAWINGS

In order that the invention may be more readily understood reference is made to the accompanying drawings in which.

Like parts are represented by like reference characters.

DESCRIPTION OF THE PREFERRED EMBODIMENTS

Figure 1:
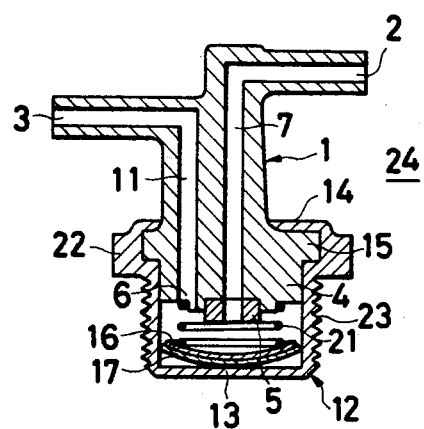
FIG. 1 is a cross-sectional view of one embodiment of a bimetal valve according to the present invention.

Referring to FIG. 1, a first housing member 1 is provided with a first port 2 and a second port 3 adapted to be connected to pipes or tubes (not shown). A valve seat 5, in the form of an O-ring, is secured in an opening provided in the center of one end portion 4 of the first housing member 1. A port 6 is provided in the first housing member 1 a given distance away from the center of end portion 4, but above valve seat 5, as shown. The first port 2 communicates with a passage 7 extending through first housing member 1, and opens through valve seat 5. Port 6 communicates with second port 3 through passage 11 which extends through the first housing member 1. A second housing member 12, of a hollow construction, has an open top side and a bottom side defined by bottom plate 13. The second housing member 12 is secured to first housing member 1 in such a manner that bottom plate 13 is spaced a predetermined distance from the end portion of first housing member 1. Open end portion 14 of second housing member 12 is fitted snugly over large diameter portion 15 of the first housing member 1.

Bimetal discs 16 and 17, of the same diameter, are provided in the space formed by end portion 4 of first housing member 1 and bottom plate 13 of the second housing member 12. The bimetal discs 16 and 17 are positioned coaxially with valve seat 5 and first housing member 1. Bimetal disc 16 is superposed on or mated with the bimetal disc 17 as seen in FIG. 1. When the ambient temperature of the valve remains below a given, predetermined temperature level A, bimetal disc 16 assumes a downwardly convex shape. On the other hand, when the ambient temperature is above a given temperature level A, then the bimetal disc 16 assumes an upwardly convex shape. When the ambient temperature is below a given predetermined level B where B > A, bimetal disc 17 assumes a downwardly convex shape, and when the ambient temperature is above temperature level B, bimetal disc 17 assumes an upwardly convex shape. A compression spring 21 or other suitable resilient means, is confined between end portion 4 of first housing member 1 and the top peripheral surface of bimetal disc 16, thereby urging bimetal disc 16 against bottom plate 13 of the second housing member 12. A large diameter portion 22 of second housing member 12 encompasses a large diameter portion 15 of first housing member 1 and is of hexagonal shape similar to that of a hexagonal bolt head, with a side portion 23 extending downwardly therefrom. Side portion 23 is threaded on its outer peripheral surface. A bimetal valve, constructed as above described, is threaded into a portion of an internal combustion engine, such as the water jacket, for detecting the temperature of the coolant.

When the ambient temperature of bimetal valve 24 is below temperature level A, the bimetal discs 16 and 17 as shown in FIG. 1, assume downwardly convex shapes in a superposed on or mated relation, so that the center portion of bimetal disc 16 is detached from the valve seat 5. At this time, first port 2 in bimetal valve 24 communicates with second port 3 by way of the chamber formed by plate 13 and end portion 4 of first housing member 1.

Figure 2:
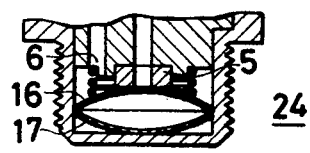
FIGS. 2 and 3 are cross-sectional views of part of the bimetal valve of FIG. 1, showing changes in shape, of bimetal discs.

When the ambient temperature of bimetal valve 24 is between temperature levels A and B, then as shown in FIG. 2, bimetal disc 16 assumes an upwardly convex shape, while the bimetal disc 17 assumes a downwardly convex shape. At this time, the central portion of bimetal disc 16 intimately contacts or is urged against valve seat 5, so that first port 2 and second port 3 in bimetal valve 24 are shut off from mutual communication.

Figure 3:
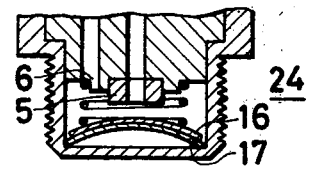

When the ambient temperature of bimetal valve 24 is above a predetermined temperature level bimetal discs 16 and 17 assume upwardly convex shapes in mated relation to each other, as shown in FIG. 3. Since the peripheral edges of discs 16 and 17 are urged against bottom plate 13 under the action of the spring 21, the top surface of the central portion of bimetal disc 16 is no longer in contact with valve seat 5. At this time, first port 2 and second port 3 in bimetal valve 24 are brought into mutual communication.

Figure 4:
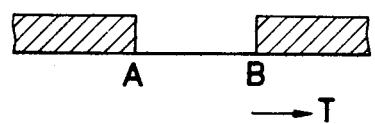
FIG. 4 is a cross-sectional view showing the open and closed conditions of the bimetal valve of FIG. 1.

FIG. 4 illustrates the open and closed conditions of bimetal valve 24. The ambient temperature T of bimetal valve 24 is represented by an abscissa. The hatched portions represent an open condition of valve 24 and the blank portion represents the closed condition of the valve.

Figure 5:
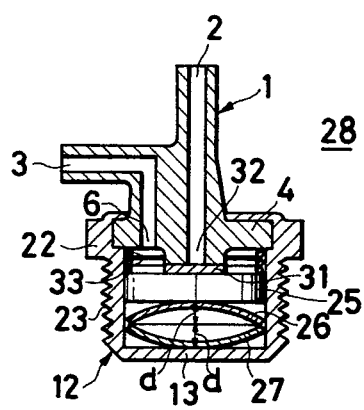
FIG. 5 is a cross-sectional view of a second embodiment of a bimetal valve according to the present invention.

FIG. 5 shows another embodiment of the bimetal valve according to the present invention, in which like parts, similar to those in valve 24 are designated by like reference numerals.

In bimetal valve 28 of FIG. 5, there are provided in the space defined by end portion 4 of first housing member 1 and bottom plate 13 of second housing member 12, reading downward, a hold-down plate 25, bimetal disc 26, and a bimetal disc 27 coaxial with port 32 in first housing member 1. Hold-down plate 25 may slidingly move in the hollow portion of second housing member 12. The surface of hold-down plate 25 on the side of port 32 is formed with a valve body 31 made of a sealing material. Port 32 provided in the end portion 4 communicates with first port 2, and is adapted to be opened or closed by means of valve body 31. When the ambient temperature is below a given predetermined temperature level A, bimetal disc 26 assumes an upwardly convex shape, and when the ambient temperature is above temperature level A, the bimetal disc 26 assumes a downwardly convex shape. When the ambient temperature is below a given predetermined temperature B, where B > A, bimetal disc 27 assumes a downwardly convex shape, and when the ambient temperature is above temperature level B, bimetal disc 27 assumes an upwardly convex shape. The distance from the center of bimetal discs 26 or 27 to the center of a chord of the disc in cross section is d. A compression spring 33 is confined between end portion 4 and hold-down plate 25, thereby urging hold-down plate 25 against bottom plate 13.

For convenience of description, it will be assumed that, when bimetal discs 26 and 27 assume convex shapes which are directed in opposite directions so as to leave a closed space therebetween, the distance between the centers of bimetal discs 26 and 27 is 2d and that the thicknesses of bimetal discs 26 and 27 are negligibly small relative to the distance d.

In operation, when the ambient temperature of bimetal valve 28 is below temperature level A, the bimetal disc 26 assumes an upwardly convex shape, as shown in FIG. 5, while the bimetal disc 27 assumes a downwardly convex shape. Accordingly, the undersurface of hold-down plate 25 is spaced a distance 2d from bottom plate 13, while the valve body 31 on hold-down plate 25 is urged into intimate contact against port 32. At this time, first port 2 and second port 3 in bimetal valve 28 are kept out of communication with each other.

Figure 6:
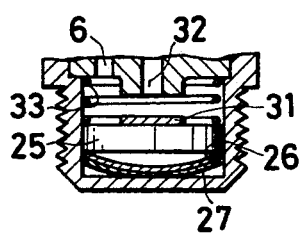
FIGS. 6 and 7 are cross-sectional views showing changes in shape of bimetal discs in the bimetal valve of FIG. 5.

When the ambient temperature is between temperature levels A and B, then, as shown in FIG. 6, bimetal discs 26 and 27 both assume downwardly convex shapes and are in mating relation. As a result, hold-down plate 25 is forced downward by the action of compression spring 33, so that the undersurface of hold-down plate 25 is spaced a distance d from bottom plate 13. At this time, the valve body 31 is detached from port 32, so that first port 2 and second port 3 in bimetal valve 28 are brought into communication with each other.

Figure 7:
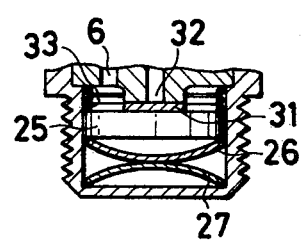

When the ambient temperature is above temperature level B, the bimetal disc 26 assumes a downwardly convex shape, as shown in FIG. 7, while bimetal disc 27 assumes an upwardly convex shape. Accordingly, the undersurface of hold-down plate 25 is spaced a distance 2d from bottom plate 13, so that valve body 31 is urged against port 32 to close same. At this time, the first port 2 and second port 3 in valve 28 are not in communication with each other.

Figure 8:
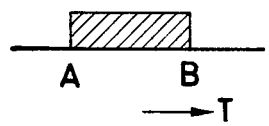
FIG. 8 is a cross-sectional view showing the open and closed conditions of the bimetal valve of FIG. 5.

FIG. 8 illustrates the open and closed conditions of bimetal valve 28. As in FIG. 4 the hatched portion represents the open condition of the valve, while the blank portion represents the closed condition thereof.

In bimetal valve 28, hold-down plate 25 not only provides a valving function, but also protection for the bimetal discs 26 and 27 from the effects of the temperature of the air which serves as the working fluid. In bimetal valves 24 and 28, two bimetal discs having different snapping temperatures are used. However, if three or more bimetal discs are used, a bimetal valve may be achieved which provides a greater number of snapping temperatures. Furthermore, by varying the arrangement of the bimetal discs, other types of open and closed conditions may be achieved.

Figure 9:
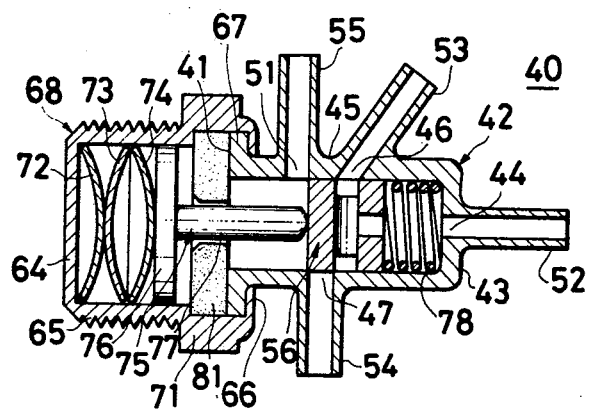
FIG. 9 is a cross-sectional view of a third embodiment of a bimetal valve according to the present invention.
Figure 10:
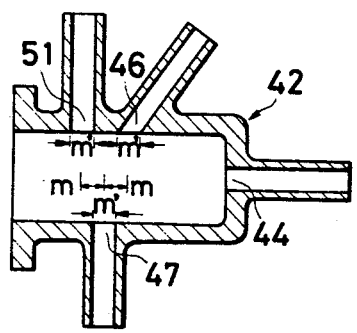
FIG. 10 is a cross-sectional view showing the relative positions of the supports in the bimetal valve of FIG. 9.
Figure 11:
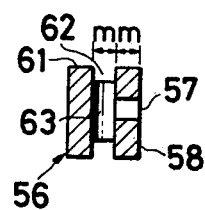
FIG. 11 is a cross-sectional view of the valve body in the bimetal valve of FIG. 9.

FIG. 9 shows still another embodiment 40 of a bimetal valve according to the present invention. The first housing member 42 is of hollow construction, and has an open end portion 41 shown on the left and a closed end or bottom portion 43 on the right as viewed in FIG. 9. A main port 44 is provided in the bottom portion 43. Side portion 45 of first housing member 42 is provided with sub-ports 46, 47 and 51. As best seen in FIG. 10, the center of sub-port 46 is spaced a distance m from the center of sub-port 47, while the center of the sub-port 47 is spaced a distance m from the center of sub-port 51 in the axial direction of first housing member 42. The diameter m' of each of the sub-ports 46, 47 and 51 is smaller than the distance m. In addition, main port 44 and sub-ports 46, 47 and 51 are provided with extensions 52, 53, 54 and 55, respectively, to which are connected appropriate pipes or tubes. A valve body 56 is slidably fitted against the inner wall of side portion 45 as seen in FIG. 11, a port 57 is provided in one end 53 of valve body 56, port 57 being directed toward main port 44. An annular groove 62 is provided in the peripheral surface 61 of valve body 56, surface 61 being the surface which slidably contacts the inner wall side portion 45. Port 57 communicates with the annular groove 62 through passage 63 in valve body 56. As shown in FIG. 11, the distance between end 58 and the inner wall defining the annular groove 62 is m, as viewed in the axial direction of valve body 56, while the width of annular groove 62 is also m, as viewed in the same axial direction. A second housing member 68 is also of hollow construction, and has a closed end portion bottom plate 64, and a side portion 65. The other end portion 66 of second housing member 68 is open and is snugly fitted around a large diameter portion 67 which is positioned radially about the side of open end portion 41, so that the second housing member 68 is secured to first housing member 42. As in the case of the bimetal valve 24, the outer peripheral surface of the side portion 65 of the second housing member 68 is threaded, while a portion 71 of second housing member 68, which encompasses the large diameter portion 67 of the first housing member 42, is of hexagonal shape. In the space or chamber defined by the end portion 41 of first housing member 42 and bottom plate 64 of second member 68, there are provided, from the left to the right, bimetal discs 72, 73 and 74 in this order. The bimetal discs 72, 73 and 74 are positioned in coaxial relation to first housing member 42. When the ambient temperature is below a given predetermined temperature level E, bimetal disc 72 at the extreme left, assumes a rightwardly convex shape, as shown in FIG. 9, and when the ambient temperature is above the temperature level E, bimetal disc 72 assumes a leftwardly convex shape. When the ambient temperature is below a predetermined temperature level F, where F > E, bimetal disc 74 at the extreme right assumes a rightwardly convex shape, and when the ambient temperature is above the temperature level F, bimetal disc 74 assumes leftwardly convex shape. When the ambient temperature is below a given predetermined temperature level G, where G > F, the center bimetal disc 73 assumes a leftwardly convex shape, and when the ambient temperature is above the temperature level G, bimetal disc 73 assumes a rightwardly convex shape. The distance from the center of bimetal discs 72, 73 or 74 to the center of a chord of the disc, in cross section, is m, the width of each bimetal disc being assumed to be negligible relative to the distance m. A piston 75 has a hold-down portion 76 and a stem portion 77. The hold-down portion 76 has the same diameter as that of the bimetal discs 72 to 74 and abuts bimetal disc 74. Stem portion 77 is guided by a guide member 81 secured to the open end portion 41 of the first housing member 42, while the tip of the stem portion 77 abuts the valve body 56. A compression spring 78 is confined between the end 58 of valve body 56 and the inside surface of the end portion 43 of first housing member 42.

When the ambient temperature of bimetal valve 40 is below temperature level E, bimetal disc 72 assumes a rightwardly convex shape, the bimetal disc 73 assumes a leftwardly convex shape, and the bimetal disc 74 assumes a rightwardly convex shape, as shown in FIG. 9. In this condition, the bimetal discs 72 and 73 contact each other at their centers, while bimetal discs 73 and 74 contact each other along their peripheral edges, so that no mating or superposed condition occurs among these discs. As a result, hold-down portion 76 of the piston 75 is spaced a distance 3 m from bottom plate 64 of second housing member 68 in the axial direction. The valve body 56 moves against the action of spring 78 by means of stem portion 77 of piston 75, so that the annular groove 62 in valve body 56 is positioned in conformity with sub-port 46. Thus, the main port 44 and the sub-port 46 in the bimetal valve 40 are brought into communication with each other.

Figure 12:
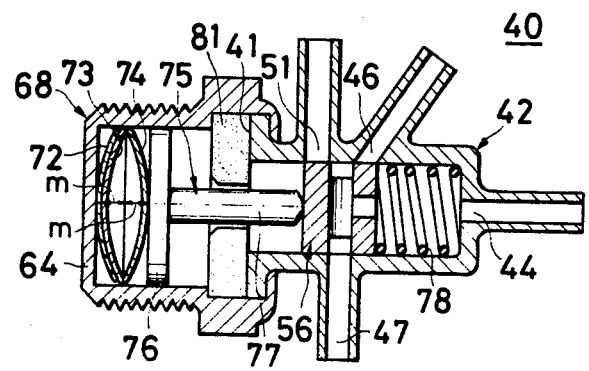
FIGS. 12, 13 and 14 are cross-sectional views showing the changes in shape of the bimetal discs in the bimetal valve of FIG. 9.

When the ambient temperature of bimetal valve 40 is above temperature level E, but below temperature level F, bimetal discs 72 and 73 assume leftwardly convex shapes, while bimetal disc 74 assumes a rightwardly convex shape, as shown in FIG. 12. Bimetal discs 72 and 73 are mated with each other in superposed relation, while bimetal discs 73 and 74 contact each other along their peripheral edges. Accordingly, the hold-down portion 76 of the piston 75 is spaced a distance 2 m from bottom plate 64 of second housing member 68. In this condition the sub-port 47 is positioned in conformity with annular groove 62 in valve body 56, while the sub-port 46 is closed by the surface 61. At this time, the main port 44 and sub-port 47 in the bimetal valve 40 are in communication with each other.

Figure 13:
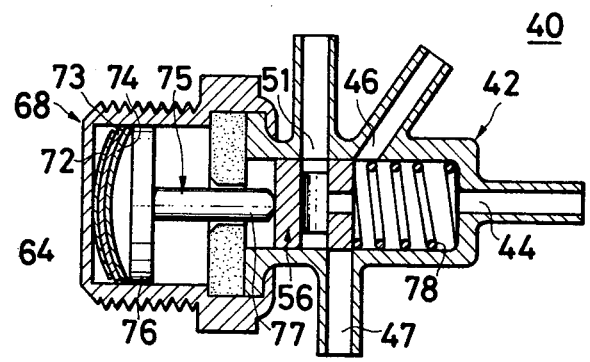

When the ambient temperature of the bimetal valve 40 is between temperature levels F and G, the bimetal discs 72, 73 and 74 all assume leftwardly convex shapes, as shown in FIG. 13. As a result, bimetal discs 72, 73 and 74 are snugly mated with each other in superposed relation. Hold-down portion 76 of the piston is now spaced a distance m from bottom plate 64 of second member 68. Sub-port 51 is now positioned in conformity with the annular groove 62, sub-port 47 is closed with the surface 61 of the valve body 56, and sub-port 46 remains open. At this time, the main port 44 communicates with both sub-ports 46 and 51.

Figure 14:
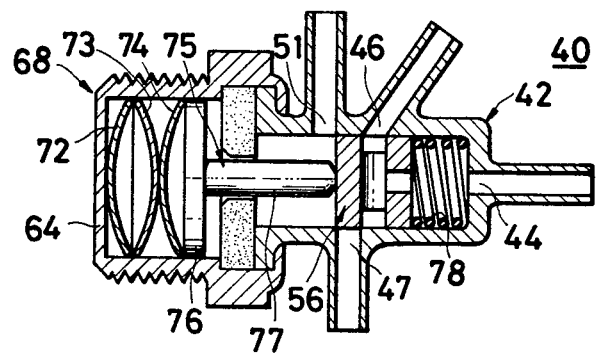

When the ambient temperature of bimetal valve 40 is above a temperature level G, bimetal disc 72 assumes a leftwardly convex shape, bimetal disc 73 assumes a rightwardly convex shape, and the bimetal disc 74 assumes a leftwardly convex shape, as shown in FIG. 14. As a result, bimetal discs 72 and 73 contact each other along their peripheral edges, while bimetal discs 73 and 74 contact each other at their centers. Accordingly, the hold-down portion 76 of piston 75 is spaced a distance 3 m from bottom plate 64 of the second housing member 68, so that the annular groove 62 is positioned in conformity with the sub-port 46. Thus, main port 44 and sub-port 46 in bimetal valve 40 are in communication with each other.

Figure 15:
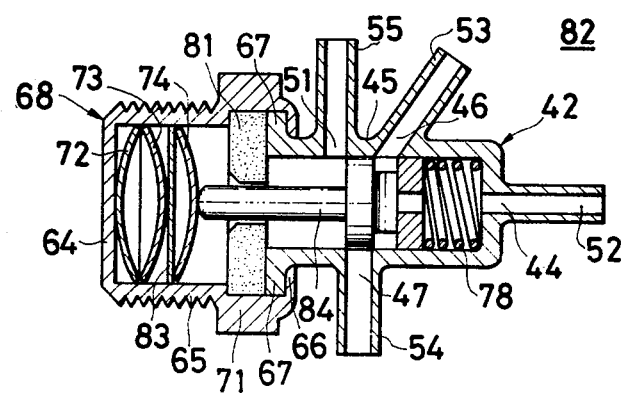
FIG. 15 is a cross-sectional view of a modification of the embodiment of the bimetal valve of FIG. 9.

FIG. 15 shows a modification 82 of bimetal valve 40, in which like parts are designated by similar reference numerals to those given in FIG. 9. With a bimetal valve 82 of FIG. 15, a partition disc 82 having a diameter slightly larger than the diameter of bimetal discs 73 and 74 is placed between the center bimetal disc 73 and disc 74 at the extreme right. As a result, even if the bimetal discs 73 and 74 assume convex shapes which are curved in the same direction, the discs 73 and 74 are not mated with each other, thereby providing connections different from those of the preceding embodiment. In addition, a member 84, consisting of a piston and a valve body is used in the bimetal valve 82.

In the cases of the bimetal valves 40 and 82, three bimetal discs are used. However, when four or more bimetal discs are used, a bimetal valve is obtained which provides a still greater number of snapping temperatures. In addition, because the bimetal discs all snap at different temperatures, other combinations of connections determined by the ambient temperatures may be obtained for the bimetal valve by changing the order in which the discs are positioned.

As will be apparent from the foregoing description of the bimetal valves made according to the present invention, passages may be opened or closed in response to two or more snapping temperatures or ambient temperature levels, so that ports communicate in desired relationships in response to two or more snapping temperatures or ambient temperature levels.

While specific embodiments of the invention have been shown and described in detail to illustrate the application of the inventive principle, it will be understood that further embodiments of the invention may be produced without departing from such principles, and that the scope of the invention is not limited except as defined in the claims which follow. It is further understood that, when reference is made in the claims to axially vertical and axially horizontal positions, such reference is only for the purpose of defining the relative orientation of the respective structural members and does not constitute a limitation on the position in which the claimed valves will operate.

What is claimed is:

1. A bimetal valve comprising:
   a first housing member having first and second fluid passages therein;
   a second housing member fitted on said first housing member in a manner to define a chamber therebetween having a bottom wall provided by one end of said second housing member;
   first and second bimetal discs positioned in said chamber, said first bimetal disc, when said chamber is oriented in an axially vertical position, assuming an upwardly convex shape when the ambient temperature of said valve is above a first predetermined temperature level, said second bimetal disc assuming a downwardly convex shape, when the ambient temperature is below a second predetermined temperature level higher than said first temperature level, and assuming an upwardly convex shape, when the ambient temperature is above said second temperature level;
   resilient means in said chamber to urge said first bimetal disc against the bottom wall of said chamber;
   said first fluid passage opening into said chamber and provided at said opening with a valve seat cooperative with said first bimetal disc to close said opening, whereby said opening may be opened or closed by said first bimetal disc cooperating with said valve seat in response to the changes in shape of said first and second bimetal discs at varying ambient temperatures including said first and second temperature levels.

2. A bimetal valve according to claim 1, wherein a hold-down plate is positioned between said opening of said first fluid passage and said first bimetal disc, said hold-down plate having a valve body secured thereto, on a side opposed to said opening, whereby said opening may be opened or closed by said valve body in response to changes in shape of said first and second bimetal discs at varying ambient temperatures.

3. A bimetal valve, comprising:
   a first housing member having a main port and first, second and third sub-ports;
   a second housing member fitted on said first housing member in a manner to define a chamber therebetween having a bottom wall provided by one end of said second housing member, portions of said chamber being contributed by each of said housing members;
   a valve body fitted in the portion of said chamber in said first housing member;
   a guide member fitted in the portion of said chamber in said second housing member;
   a hold-down portion fitted in the portion of said chamber in said second housing member, said hold-down portion having a stem portion piercing through said guide member to abut said valve body, whereby there are formed in said chamber a first sub-chamber defined between said bottom wall of said second housing member and said hold-down portion, a second sub-chamber defined between said hold-down portion and said guide member, a third sub-chamber defined between said hold-down portion and said valve body, and a fourth sub-chamber defined between said valve body and said main port;
   resilient means confined between said valve body and said main port in said fourth sub-chamber;
   first, second and third bimetal discs positioned in said first sub-chamber formed by the bottom wall of said second housing member and said hold-down portion, said first bimetal disc, positioned on the side of said bottom wall, assuming a rightwardly convex shape when said valve is axially oriented in a horizontal position when the ambient temperature is below a first predetermined temperature level, and assuming a leftwardly convex shape when the ambient temperature is above said first predetermined temperature level, said third bimetal disc being positioned on the side of said hold-down plate, assuming a rightwardly convex shape, when the ambient temperature of said valve is below a second predetermined temperature level higher than said first temperature level, and assuming a leftwardly convex shape when the ambient temperature of said valve is above said second temperature level, said second bimetal disc, positioned between said first and third bimetal discs, assuming a leftwardly convex shape, when the ambient temperature of said valve is below a third predetermined temperature level higher than said second temperature level, and assuming a rightwardly convex shape, when the ambient temperature of said valve is above said third temperature level;
   said valve body having an annular groove in its outer peripheral surface, said annular groove being disposed in a manner to be positioned in conformity with said first or third sub-port, on one hand, and with said second sub-port, on the other, thereby establishing fluid paths between said first sub-port and said second sub-port, between said main port and said second sub-port, between said main port and said third sub-port, and between said main port and said first sub-port, depending on changes in shape of said first, second and third bimetal discs at different ambient temperatures, said valve body further including a fluid passage connecting said annular groove with said fourth sub-chamber communicating with said main port.

4. A bimetal valve, comprising:

a first housing member having a main port, first sub-port, second sub-port, and third sub-port;

a second housing member fitted in said first housing member in a manner to define a chamber therebetween having a bottom wall provided by one end of said second housing member, portions of said chamber being contributed by each of said housing members;

a valve body fitted in the portion of said chamber in said first housing member, said valve body having a stem portion;

a guide member fitted in the portion of said chamber in said second housing member, said guide member having a central hole adapted to receive said stem portion therein, whereby there are defined in said chamber a first sub-chamber formed by the bottom wall of said second housing member and said guide member, a second sub-chamber formed by said valve body and said guide member, and a third sub-chamber formed by said valve body and said main port;

resilient compression means confined between said valve body and said main port;

first, second and third bimetal discs positioned in said first sub-chamber formed by said bottom wall of said second housing member and the end of said stem secured through said guide member to said valve body, said first bimetal disc being positioned on the side of said bottom portion, assuming a rightwardly convex shape when the ambient temperature is below a first predetermined temperature level, and assuming a leftwardly convex shape when the ambient temperature is above said first temperature level, said third bimetal disc being positioned on the side of said one end of said stem portion, assuming a rightwardly convex shape, when the ambient temperature of said valve is below a second predetermined temperature higher than said first temperature level, and assuming a leftwardly convex shape, when an ambient temperature of said valve is above said second temperature level, said second bimetal disc being positioned between said first and third bimetal discs, assuming a leftwardly convex shape, when the ambient temperature of said valve is below a third predetermined temperature level higher than said second temperature level, and assuming a rightwardly convex shape, when the ambient temperature of said valve is above said third temperature level; said valve body having an annular groove in its outer peripheral surface, said annular groove being disposed in a manner to be positioned in conformity with said first or third sub-ports on one hand, and with said second sub-port on the other, thereby establishing fluid paths between said first sub-port and said second sub-port, between said main port and said second sub-port, between said main port and said third sub-port, and between said main port and first sub-port, depending on changes in shape, of said first, second and third bimetal discs at varying ambient temperatures of said valve; and a partition plate positioned between said second and third bimetal discs;

said valve body further including a fluid passage communicating said annular groove with said fourth sub-chamber, said fourth sub-chamber communicating with said main port.

5. A bimetal valve according to claim 3, wherein the width of said annular groove is larger than the diameter of said first, second and third sub-ports, the width of said annular groove being equal to each of those of side portions or lands of said valve body, which are left on the opposite sides of said annular groove in said valve body.

6. A bimetal valve according to claim 4, wherein the width of said annular groove is larger than the diameter of said first, second and third sub-ports, the width of said annular groove being equal to each of those of side portions or lands of said valve body, which are left on the opposite sides of said annular groove in said valve body.

7. A bimetal valve comprising:
a first housing member having first and second fluid passages therein;

a second housing member fitted on said first housing member in a manner to define a chamber therebetween having a bottom wall provided by one end of said second housing member;

first and second bimetal discs positioned in said chamber, said first bimetal disc, when said chamber is oriented in an axially vertical position, assuming an upwardly convex shape when the ambient temperature of said valve is above a first predetermined temperature level and assuming a downwardly convex shape when the ambient temperature of said valve is below said first predetermined level, said second bimetal disc assuming a downwardly convex shape, when the ambient temperature is below a second predetermined temperature level higher than said first temperature level, and assuming an upwardly convex shape, when the ambient temperature is above said second temperature level;

resilient means in said chamber for biasing said first bimetal disc toward the bottom wall of said chamber;

said first fluid passage opening into said chamber and provided at said opening with a valve seat cooperative with said first bimetal disc to close said opening, whereby said opening may be opened or closed by said first bimetal disc cooperating with said valve seat in response to the changes in shape of said first and second bimetal discs at varying ambient temperatures including said first and second temperature levels.

8. A bimetal valve comprising:
a first housing member having first and second fluid passages therein;

a second housing member fitted on said first housing member in a manner to define a chamber therebetween having a bottom wall provided by one end of said second housing member;

first and second bimetal discs positioned in said chamber, said first bimetal disc, when said chamber is oriented in an axially vertical position, assuming a downwardly convex shape when the ambient temperature of said valve is above a first predetermined temperature level and assuming an upwardly convex shape when the ambient temperature of said valve is below said first predetermined level, said second bimetal disc assuming a downwardly convex shape, when the ambient temperature is below a second predetermined temperature level higher than said first temperature level, and assuming an upwardly convex shape, when the ambient temperature is above said second temperature level;

resilient means in said chamber for biasing said first bimetal disc toward the bottom wall of said chamber;

said first fluid passage opening into said chamber and provided at said opening with a valve seat cooperative with said first bimetal disc to close said opening, whereby said opening may be opened or closed by said first bimetal disc cooperating with said valve seat in response to the changes in shape of said first and second bimetal discs at varying ambient temperatures including said first and second temperature levels.

* * * * *